(12) United States Patent
Leung

(10) Patent No.: US 6,976,014 B2
(45) Date of Patent: Dec. 13, 2005

(54) MEDIATE SOFTWARE TOOL APPLICABLE TO SERVER FOR ACCESS TO A SQL DATABASE

(76) Inventor: Kwok-Yan Leung, 53 Applegate Cres, Willowdale, ON (CA) M2H 2R5

(*) Notice: Subject to any disclaimer, the term of this patent is extended or adjusted under 35 U.S.C. 154(b) by 652 days.

(21) Appl. No.: 10/040,559

(22) Filed: Jan. 5, 2002

(65) Prior Publication Data

US 2003/0130988 A1 Jul. 10, 2003

(51) Int. Cl.[7] .............................................. G06F 17/30
(52) U.S. Cl. ............................... 707/2; 707/3; 709/219
(58) Field of Search .............................. 707/1–3, 8–10, 707/103, 201, 104.1; 718/1, 107; 709/200–203, 709/216–219; 719/310–317, 328, 330; 717/100

(56) References Cited

U.S. PATENT DOCUMENTS 6,021,405 A * 2/2000 Celis et al. ..................... 707/2
6,484,149 B1 * 11/2002 Jammes et al. ............... 705/26

* cited by examiner

Primary Examiner—Antony Nguyen-Ba

(57) ABSTRACT

A mediate software tool for access to a SQL database is applicable to a server for expanding the capacity of a SQL engine so as to service more people simultaneously. The mediate software tool comprises an access module and a SQL instruction dispatching/receiving module. The access module is arranged for building a plurality of SQL instruction accesses on a net between the server and a plurality of client computers, in which the built SQL instruction accesses are usable for transmitting/receiving a SQL instruction and the processed result thereof. The SQL instruction dispatching/receiving module is arranged for dispatching the SQL instructions in the SQL instruction accesses to the SQL engine for processing and for receiving the processed result and transmitting the same to the access module.

4 Claims, 12 Drawing Sheets

MEDIATE SOFTWARE TOOL APPLICABLE TO SERVER FOR ACCESS TO A SQL DATABASE

FIELD OF THE INVENTION

This invention relates generally to a server for execution of a SQL (structured query language) engine, which is usable for just a limited number of users simultaneously, more particularly, it relates to a mediate software tool applicable to server that allows more people to join the SQL engine for access to a SQL database.

BACKGROUND OF THE INVENTION

If a conventional server that services a limited number of users to access a SQL database has a numerosity of client computers suddenly expanded, the access to the SQL database would be probably jammed and paralyzed immediately. Under such a situation, there seems no other choice but replace the SQL engine with a renewed version of larger capacity that might entail great expense for endless requirements.

SUMMARY OF THE INVENTION

The primary object of this invention is to provide a mediate software tool applicable to server so as to expand the available capacity of a SQL engine.

In order to realize abovesaid object, a server for application of the mediate software tool of this invention must be provided with a SQL database and a SQL engine with a limited capacity in access of the SQL database such that the capacity of availability of the SQL engine can be expanded to allow more people to join with. This mediate software tool comprises: an access module for establishing a plurality of instruction accesses between the server and a plurality of client computers and for transmitting/receiving the SQL commands and the processing results thereof by taking advantage of the built instruction accesses; and a SQL instruction dispatching/receiving module, which is responsible to dispatch the SQL commands to the SQL engine and receive the processed results from the SQL engine and transmit the same to the access module.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
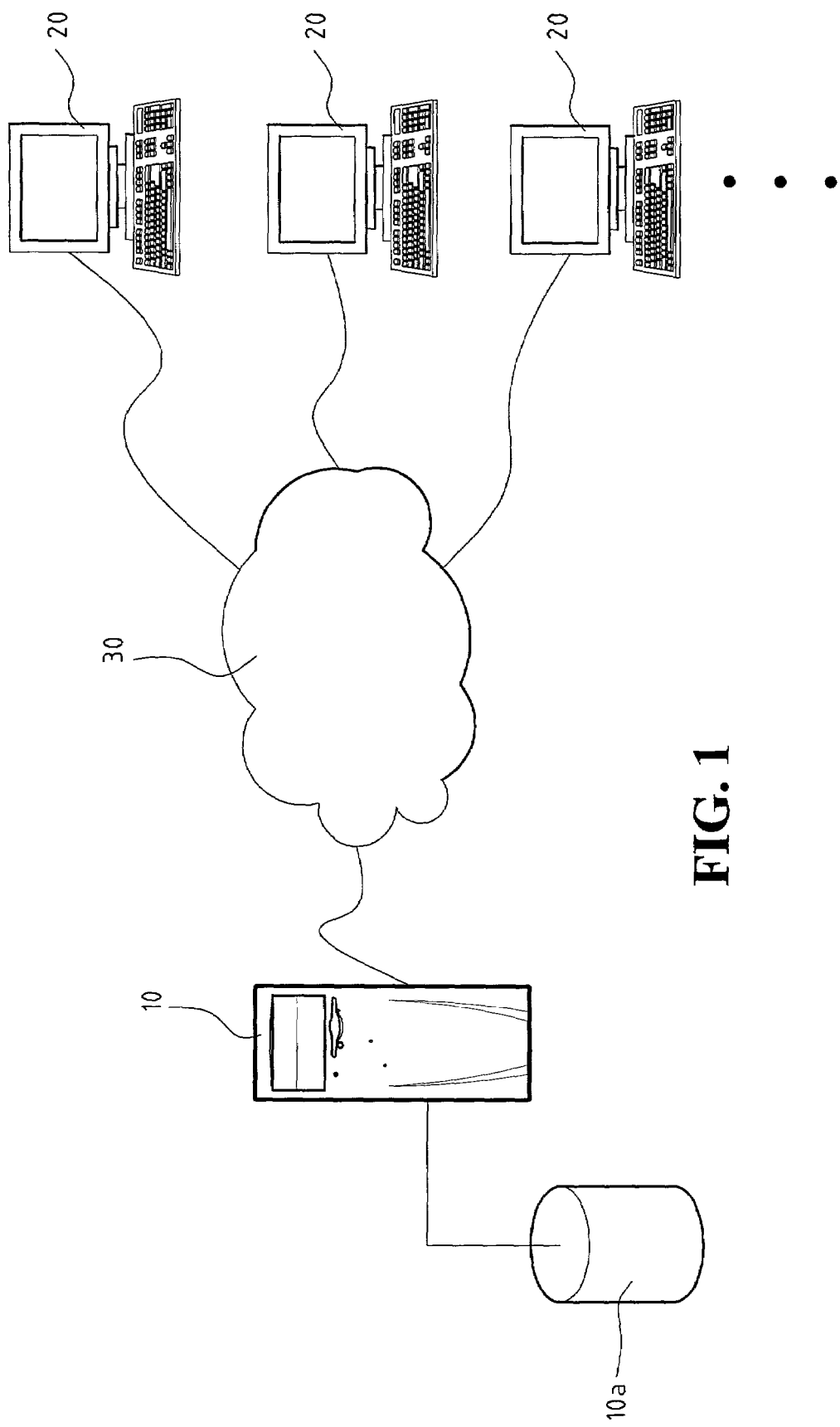
FIG. 1 shows the hardware connectivity of a plurality of client computers and a server, where this invention is applied.

FIG. 1 shows the hardware connectivity of a plurality of client computers and a server, where this invention is applicable. A net 30 connects a server 10 with a plurality of client computers 20, in which the net 30 could be the Internet or an Intranet, and the server 10 comprises at least a SQL (structured query language) database 10a and a SQL engine 10b, whose user's amount is constrained for access of the SQL database. The SQL engine 10b and a mediate software tool 100 of this invention are to be executed by the server 10.

Figure 2:
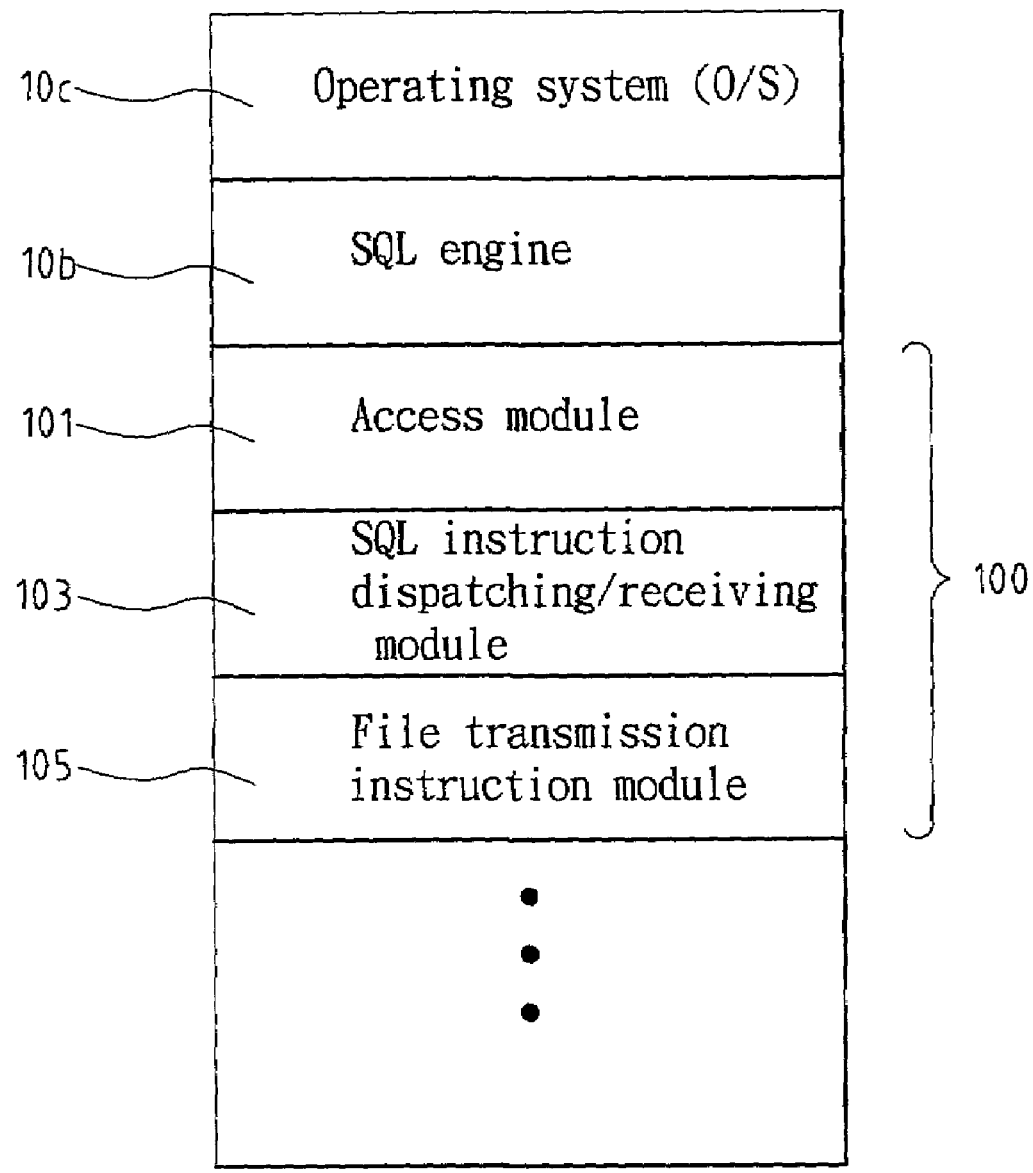
FIG. 2 shows the configuration of the main memory in the server shown in FIG. 1.

FIG. 2 shows the configuration of the main memory in the server shown in FIG. 1. The memory of the server 10 stores at least: a windows O/S of server version 10c; the user's amount constrained SQL engine 10b; and an access module 101 and a SQL instruction dispatching/receiving (d/r) module 103 of the mediate software tool 100, in which the Windows O/S of server version 10c could be the operation system (O/S) of the Windows NT or Windows 2000, and the SQL engine 10b is the SQL server software of Microsoft Corporation.

Figure 3A:
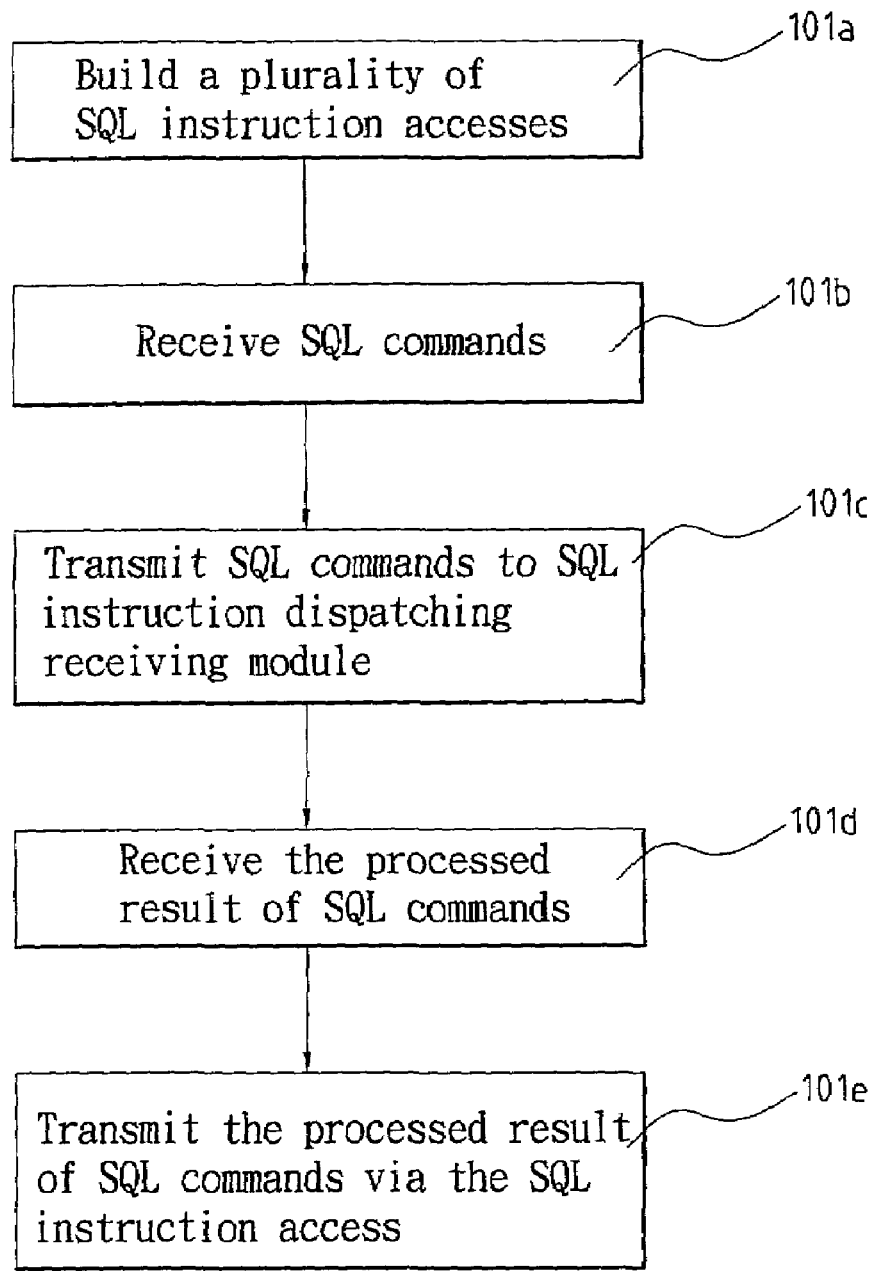
FIG. 3A shows a processing flowchart of an access module of this invention.

FIG. 3A shows a processing flowchart of an access module of this invention. A step 101a is to build a plurality of SQL instruction accesses 1010 on the net 30 between the server 10 and the client computers 20. A step 101b is to receive a SQL instruction 40 included in the SQL instruction accesses 1010 and a step 101c is to transmit the SQL instruction 40 to the SQL instruction d/r module 103. A step 101d is to receive the processed result 50 of SQL instruction from the SQL instruction d/r module 103 and a step 101e is to transmit the processed result 50 of SQL instruction to the client computers 20 via the SQL instruction accesses 1010.

Figure 3B:
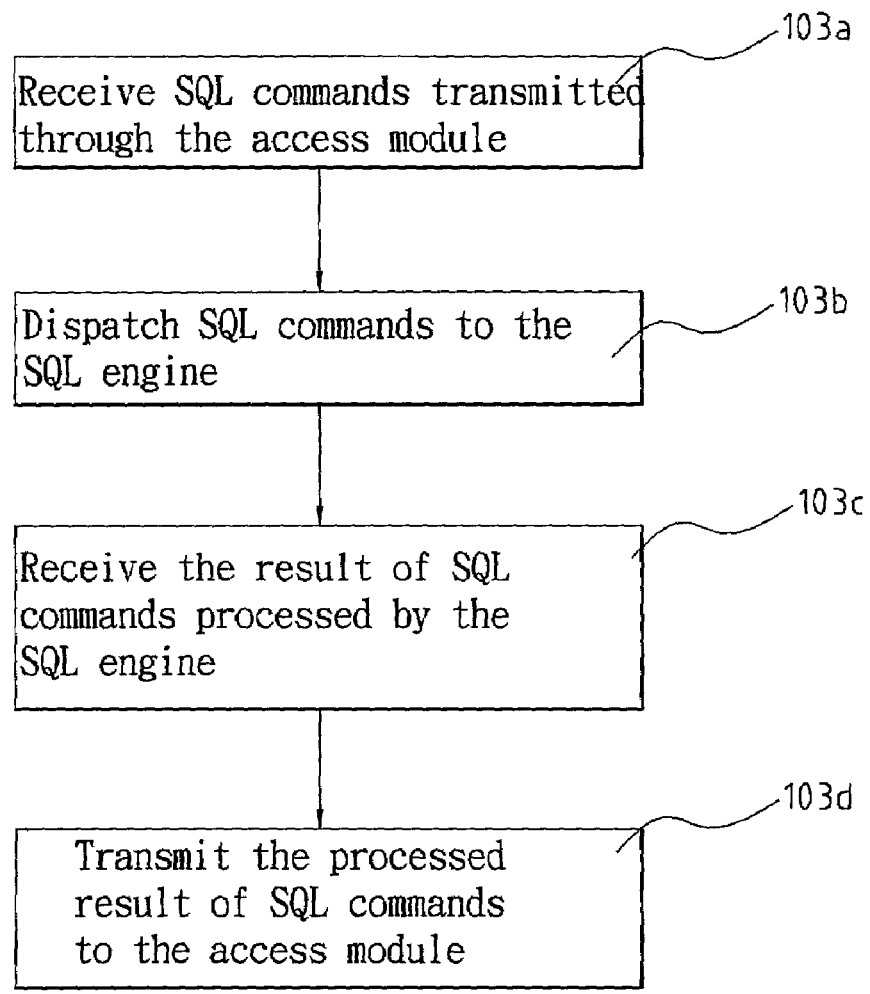
FIG. 3B shows a processing flowchart of a SQL instruction dispatching/receiving module of this invention.

FIG. 3B shows a processing flowchart of the SQL instruction d/r module of this invention. A step 103a is supposed to receive the SQL instruction 40 transmitted from the access module 101, and a step 103b is to dispatch the SQL instruction 40 to the SQL engine 10b for processing. Then, a step 103c is to receive the processed result 50 of SQL instruction processed by the SQL engine 10b, and a step 103d is to transmit the processed result 50 of SQL instruction to the access module 101.

Figure 4:
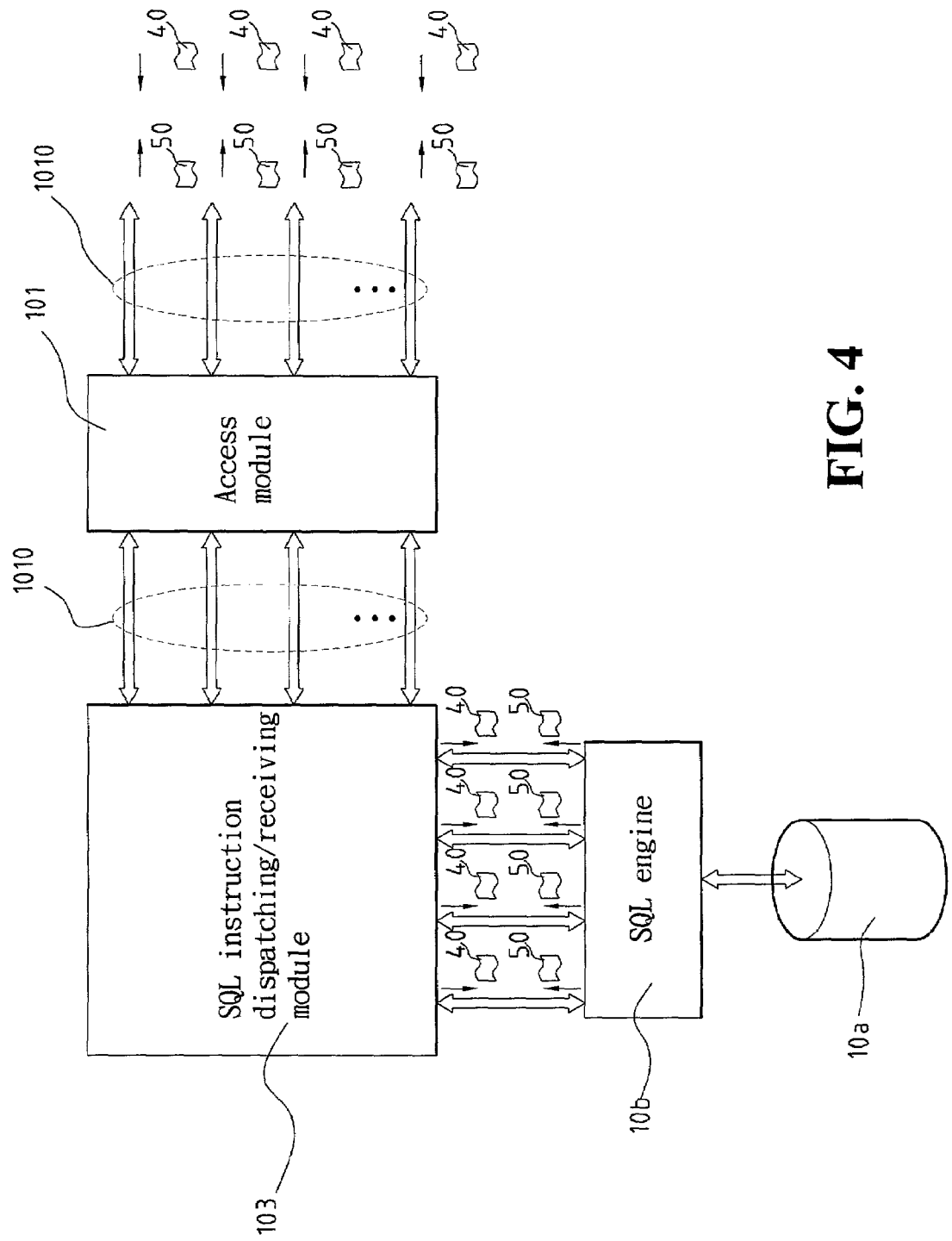
FIG. 4 is a schematic view showing that a narrow access of a SQL engine is broadened after this invention is employed in the server thereof.

FIG. 4 is a schematic view showing that a narrow access of a SQL engine is broadened after this invention is employed in the server thereof. The SQL engine 10b in FIG. 4 is a SQL engine capable of accommodating four persons only, namely, it can process the SQL instruction 40 of four client computers 20 the maximum. In this typical example shown in FIG. 4, the maximum amount of the SQL instruction access 1010 buildable in the access module 101 is the product of the maximum number of people who is accepted for using simultaneously the SQL engine 10b by 256, namely, 4*256≅1000. In other words, the access module 101 can link online with 1000 client computers simultaneously for the latter to access the SQL database 10a. Also in this figure, the SQL instruction d/r module 103 is supposed to receive a SQL instruction 40 provided by one of the 1000 client computers 20 through the access module 101, then dispatch that SQL instruction to the SQL engine 10b for processing. The processed result of the SQL instruction 50 transmitted back to the client computer 20 via the SQL instruction access 1010 of the access module 101.

Figure 5:
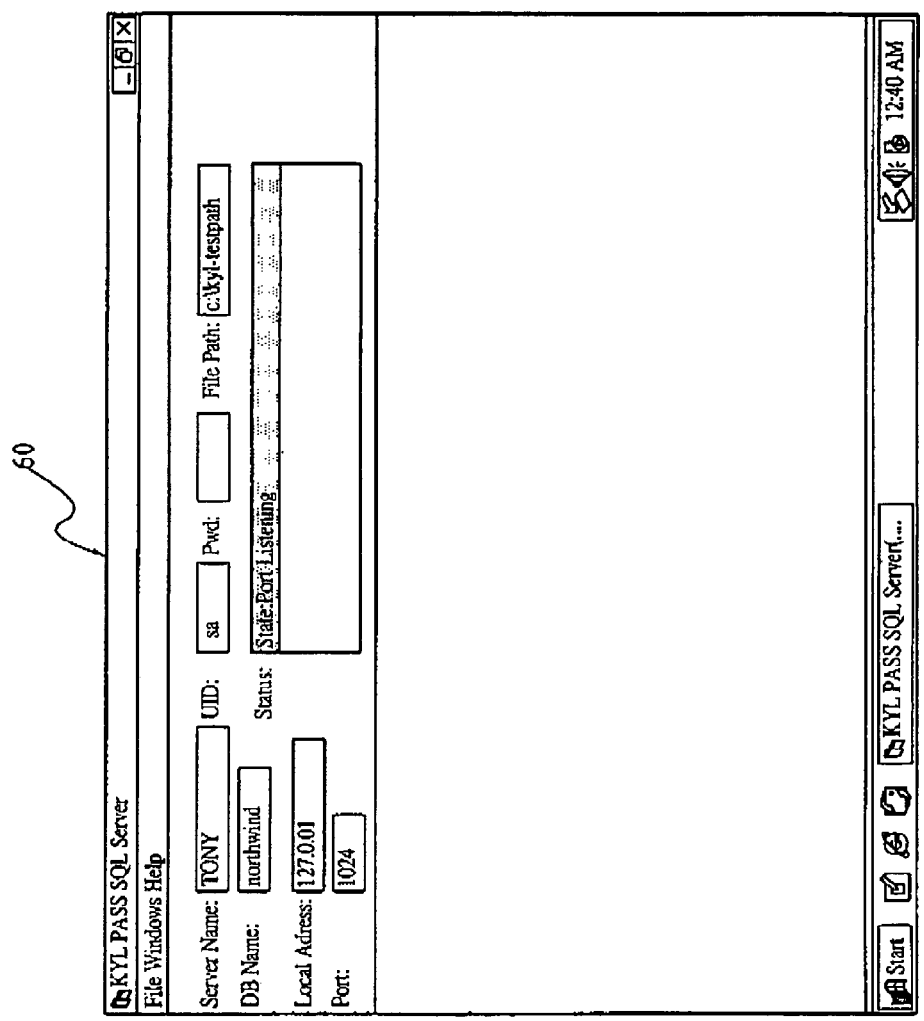
FIG. 5 is a picture shown on a server's display, in which a mediate software tool is executed in the server.
Figure 6:
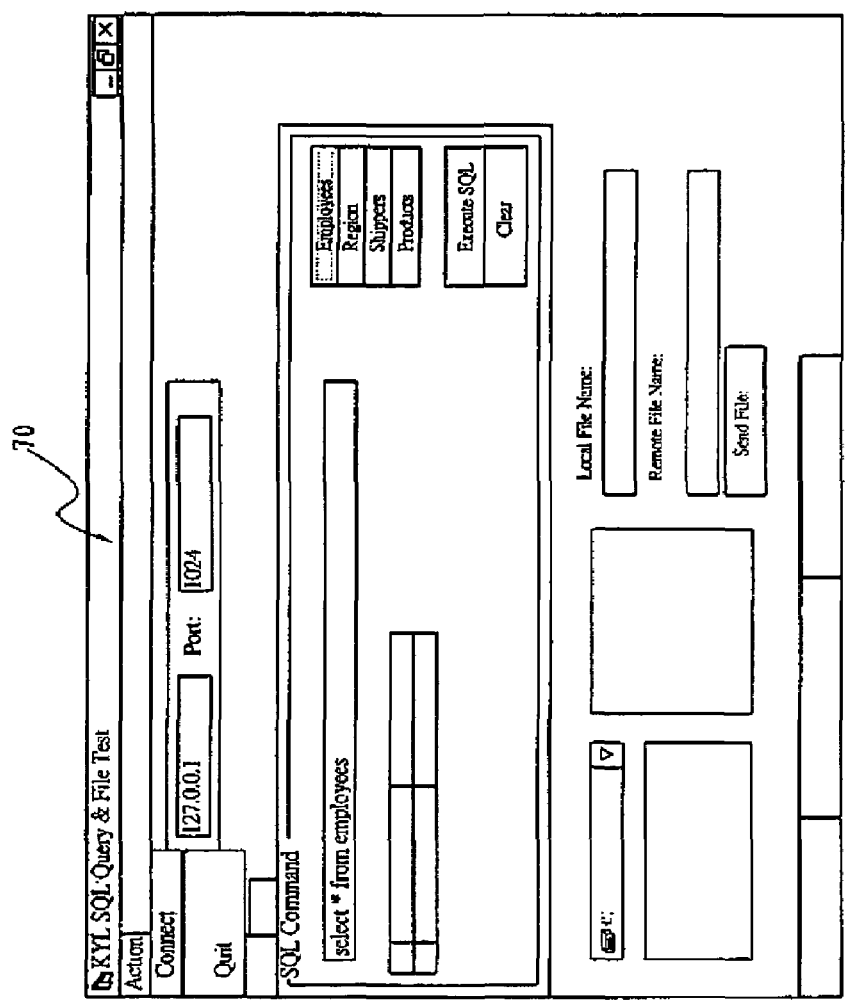
FIG. 6 is a picture shown on a client computer, in which the client computer is giving instructions to the access module of the server requesting for building a SQL instruction access.

FIG. 5 is a picture 60 shown on the server 10, in which the mediate software tool 100 of this invention is executed. FIG. 6 is a picture 70 shown on a client computer 20, which is giving instructions to the access module 101 of the server 10 requesting for building a SQL instruction access 1010.

Figure 7A:
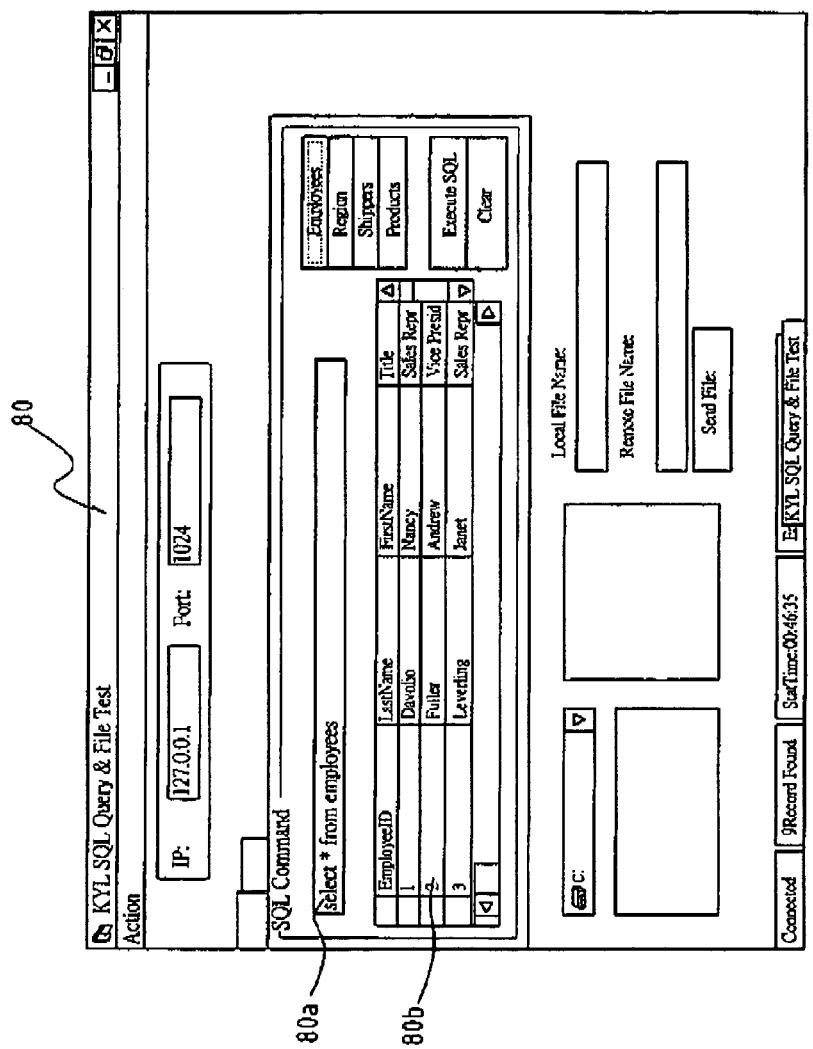
FIG. 7A is a picture shown on a client computer representing the response from the server to the instruction of the client computer requesting for building a SQL instruction access.
Figure 7B:
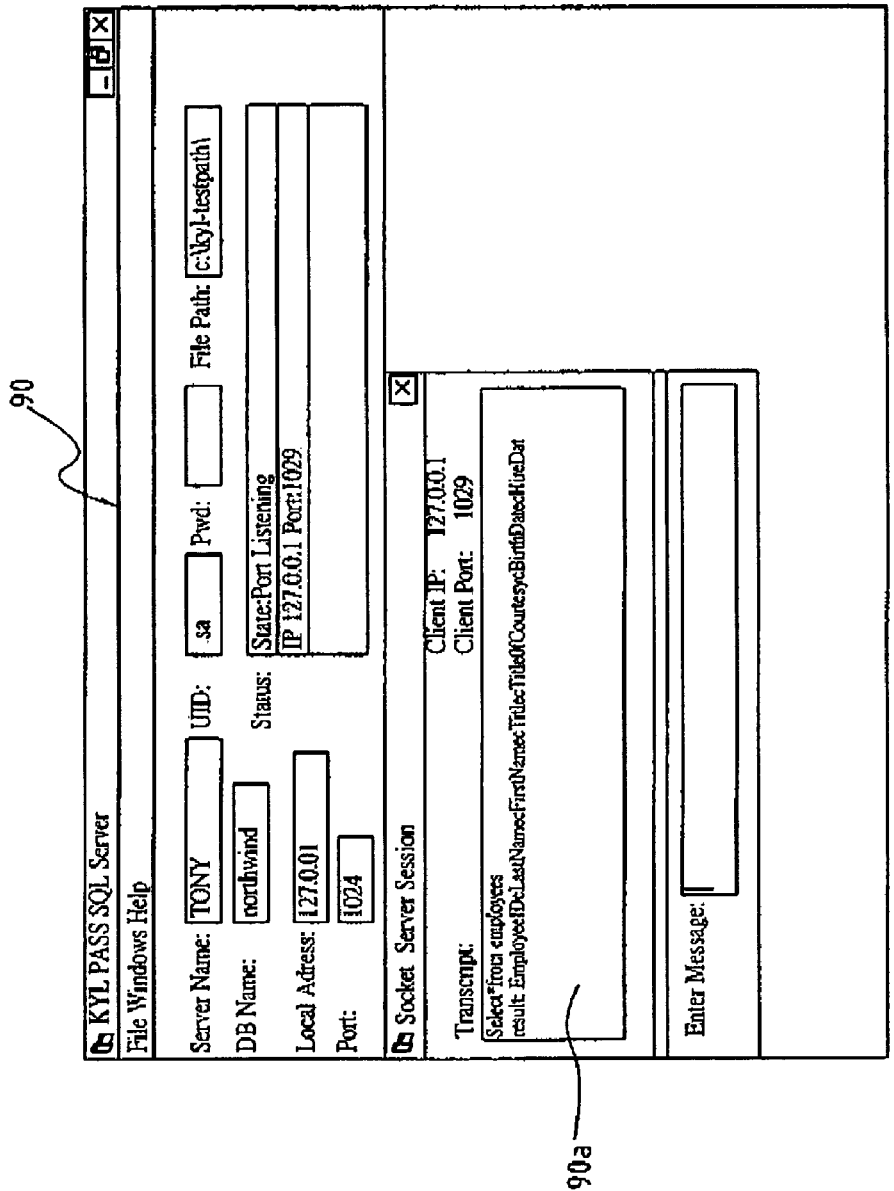
FIG. 7B shows a picture on the server under the situation shown in FIG. 7A.

FIG. 7A is a picture 80 shown on a client computer 20 representing the response from the server to the instructions of the client computer that has requested for building a SQL instruction access. In the picture 80, a SQL instruction 40 of "select * from employees" is inputted to a block 80a under SQL Command menu, and the result 50 is shown in a block 80b after being processed by the server 10. FIG. 7B shows a picture on the server under the situation shown in FIG. 7A. In a picture 90 shown on the display (not shown) of the server 10, a block 90a reveals the related processing status of the SQL instruction 40 of "select * from employees."

Figure 8:
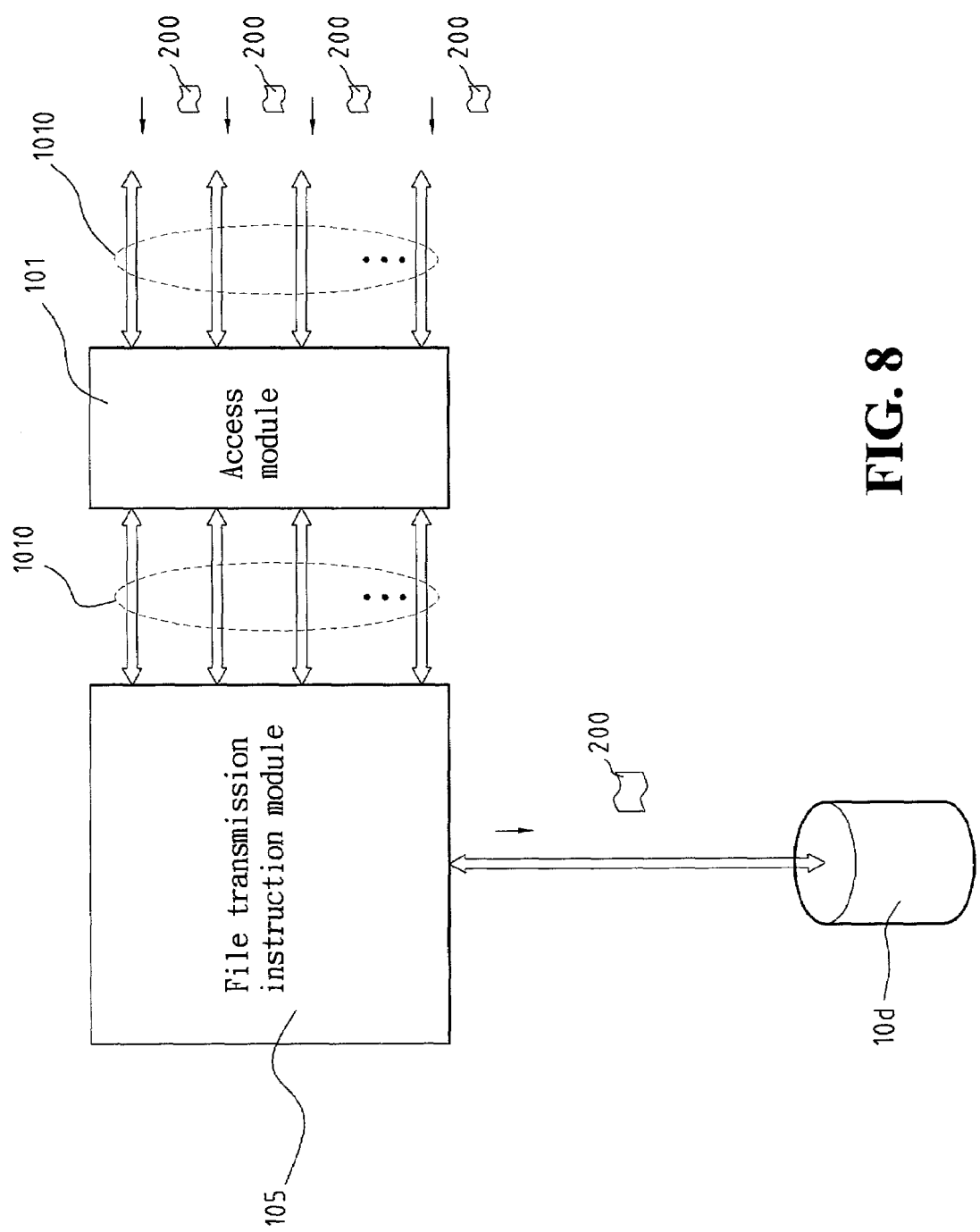
FIG. 8 is a schematic view showing file transmission performed by an instruction module of the server.

The mediate software tool of this invention further comprises a file transmission instruction module 105 as illustrated in FIG. 8. A file transmission command 200 from a client computer 20 can be transmitted to the file transmission instruction module 105 through the SQL instruction access 1010 built by the access module 101. Then, the file transmission instruction module 105 would start to process the data according to the file transmission command 200 so as to effect the file transmission from the client computer 20 and store the file transmitted in a storing device 10d of the server 10.

Figure 9A:
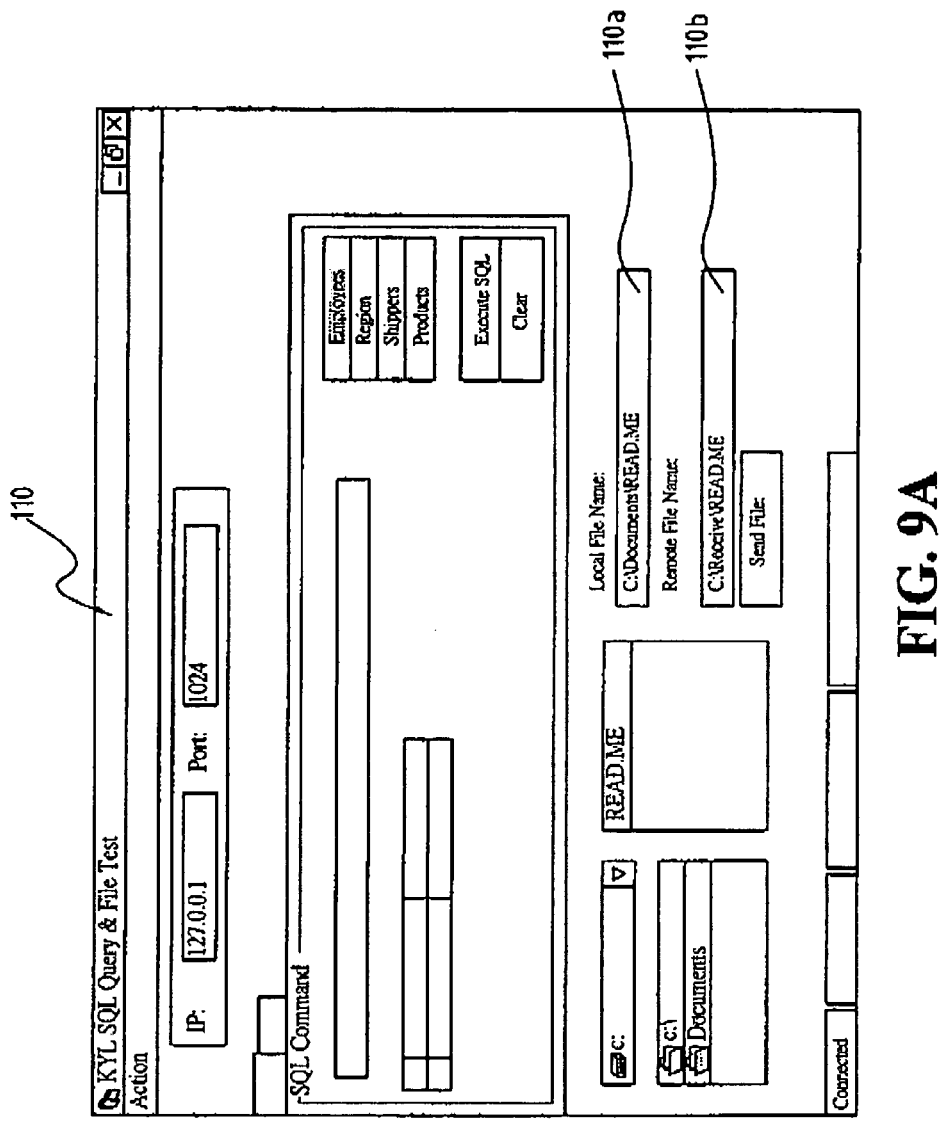
FIG. 9A shows that a client computer is uploading a file to the server.
Figure 9B:
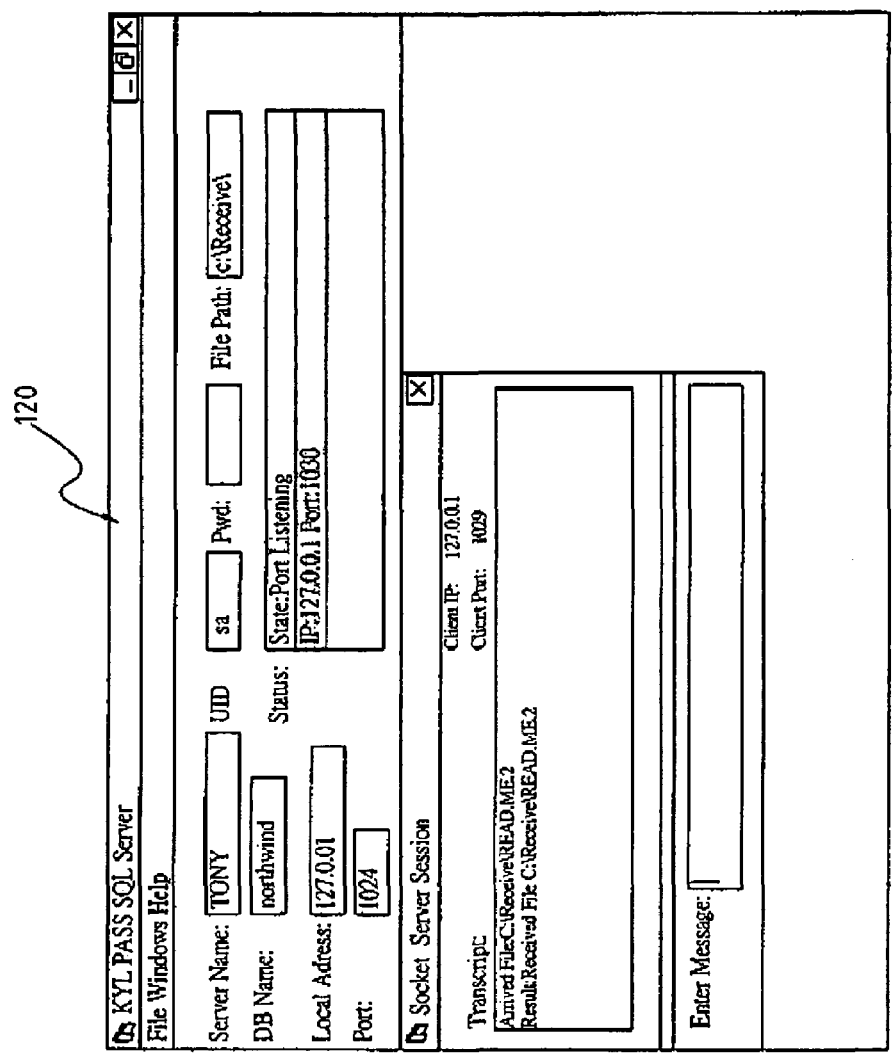
FIG. 9B is a picture shown on the server under the situation in FIG. 9A.

FIG. 9A shows that a client computer is uploading a file to the server. In a picture 110 shown in the client computer 20, a file path is inputted to a block 110a, then a transmission command is effected in a block 110b. FIG. 9B is a picture 120 shown on the server under the situation in FIG. 9A. In this picture 120, a block 120a reveals the processing status of the file transmission command.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A mediate software tool applied in a server for access to a SQL (structured query language) database, in which the server comprises at least a SQL database and a SQL engine available for a limited number of users' access to the SQL database, the mediate software tool comprising:
    an access module for building a plurality of SQL instruction accesses on a net between the server and a plurality of client computers, in which the built SQL instruction accesses are usable for transmitting/receiving a SQL instruction and a processed result thereof; and
    a SQL instruction dispatching/receiving module for dispatching the SQL instructions in the SQL instruction accesses to the SQL engine for processing and receiving the processed result and transmitting the processed result to the access module;
    wherein the mediate software tool is executed in the server for increasing the number of users that can access the SOL database.

2. The mediate software tool according to claim 1, in which the net is Internet.

3. The mediate software tool according to claim 1, in which the net is an Intranet.

4. The mediate software tool according to claim 1, further comprising a file transmission instruction module for transmitting files in the client computers and storing the files in the server.

* * * * *